(12) United States Patent
Park et al.

(10) Patent No.: US 8,585,331 B2
(45) Date of Patent: Nov. 19, 2013

(54) CUTTING INSERT HAVING DISSIMILAR UPPER AND LOWER CUTTING FACES FOR ROUGHING AND FINISHING

(75) Inventors: Hong Sik Park, Daegu (KR); Hee Yun Son, Daegu (KR)

(73) Assignee: TaeguTec, Ltd., Dalsung-gun, Daegu (KR)

( * ) Notice: Subject to any disclaimer, the term of this patent is extended or adjusted under 35 U.S.C. 154(b) by 301 days.

(21) Appl. No.: 13/248,839

(22) Filed: Sep. 29, 2011

(65) Prior Publication Data

US 2012/0051856 A1  Mar. 1, 2012

Related U.S. Application Data

(63) Continuation-in-part of application No. PCT/KR2009/004748, filed on Aug. 26, 2009.

(30) Foreign Application Priority Data

Apr. 2, 2009  (KR) .................. 10-2009-0028502

(51) Int. Cl.
  *B23B 27/22* (2006.01)
  *B23C 5/00* (2006.01)

(52) U.S. Cl.
  USPC ............................. 407/113; 407/114; 407/103

(58) Field of Classification Search
  USPC ................... 407/113, 114, 115, 116, 103
  See application file for complete search history.

(56) References Cited

U.S. PATENT DOCUMENTS

| | | | | |
|---|---|---|---|---|
| 5,222,843 A | * | 6/1993 | Katbi et al. | 407/114 |
| 7,121,772 B2 | * | 10/2006 | Krahula et al. | 407/113 |
| 7,234,900 B2 | * | 6/2007 | Satran et al. | 407/113 |
| 8,025,465 B2 | * | 9/2011 | Ishida | 407/114 |
| 8,113,746 B2 | * | 2/2012 | Koga | 407/113 |
| 2007/0104546 A1 | | 5/2007 | Maeta et al. | |
| 2009/0285646 A1 | * | 11/2009 | Oprasic et al. | 407/114 |

FOREIGN PATENT DOCUMENTS

| | | |
|---|---|---|
| JP | 2000-141109 A | 5/2000 |
| JP | 2003-191110 A | 7/2003 |
| JP | 2008-018515 A | 1/2008 |
| WO | WO92-14570 A1 | 9/1992 |

OTHER PUBLICATIONS

International Search Report in PCT/KR2009/004748, dated May 3, 2010.
Written Opinion in PCT/KR2009/004748, dated May 3, 2010.

* cited by examiner

*Primary Examiner* — Will Fridie, Jr.
(74) *Attorney, Agent, or Firm* — Womble Carlyle

(57) ABSTRACT

A cutting insert includes a through hole passing through oppositely facing upper and lower faces which have dissimilar structures, and are connected by a plurality of side faces. The upper face has an upper cutting edge formed on the outer periphery thereof, a flat land at the highest level disposed adjacent to and along the upper cutting edge, and a groove region at a level lower than that of the upper cutting edge and disposed between the flat land and the through-hole. The lower face has chip breakers formed on parts of peripheral regions which include each of the corners made by adjacent side faces, lower cutting edges formed on the outer periphery of the lower face along the chip breakers, and a flat supporting surface formed on the peripheral regions between adjacent chip breakers and continuously on regions inward of the chip breakers.

21 Claims, 8 Drawing Sheets

CUTTING INSERT HAVING DISSIMILAR UPPER AND LOWER CUTTING FACES FOR ROUGHING AND FINISHING

RELATED APPLICATIONS

This is a Continuation-in-Part of International Patent Application No. PCT/KR2009/004748, filed Aug. 26, 2009 and published as WO 2010/114201 on Oct. 7, 2010, which claims priority to Korean Patent Application No. 2009-0028502, filed Apr. 2, 2009. The contents of the aforementioned applications are incorporated by reference in their entirety.

TECHNICAL FIELD

This disclosure is related to a cutting insert used for roughing and finishing.

BACKGROUND ART

Since cutting inserts for rough machining large workpieces are placed under heavy loads, they are relatively large in size and are provided with a broad supporting surface on the bottom. Generally, since roughing inserts of this kind have a relatively large depth of cut and feed rate, they are fixed to the pocket of a tool holder by a lever projected through a pocket base, and not by a clamp coupled from above, to minimize interference.

However, since conventional roughing inserts are provided with cutting edges only on the upper surface, they are discarded when the cutting edges on the upper surface are worn out, which is uneconomical.

SUMMARY

The present disclosure aims to provide a cutting insert having a sufficient bottom area for supporting an applied force during roughing, and also having cutting edges for finishing, thereby allowing the cutting insert to be used for the dual purpose of roughing and finishing.

A cutting insert according to the present disclosure comprises an upper face and a lower face opposite to each other, a plurality of side faces connecting the upper face and the lower face, and a through-hole passing through the upper face and the lower face.

The upper face and lower face are non-identical cutting faces having dissimilar structures. The upper face comprises an upper cutting edge formed on the outer periphery thereof, a flat land at the highest level disposed adjacent to and along the upper cutting edge, and a groove region at a level lower than that of the upper cutting edge and disposed between the flat land and the through-hole. The lower face comprises chip breakers formed on parts of peripheral regions which include each of the corners made by adjacent side faces, lower cutting edges formed on the outer periphery of the lower face along the chip breakers, and a flat supporting surface formed on the peripheral regions between adjacent chip breakers and continuously on regions inward of the chip breakers.

The upper face of the cutting insert according to the present disclosure may comprise a negative land inclined outward and disposed between the upper cutting edge and the flat land.

The groove region of the upper face of the cutting insert according to the present disclosure may be connected by an inclined surface extending downwardly from the flat land in a direction of the bottom face.

The chip breakers of the cutting insert according to the present disclosure may comprise groove regions having a level lower than that of the lower cutting edges and connected by an inclined surface extending downwardly from the lower cutting edges in a direction of the upper face, and the flat supporting surface may be at the highest level of the lower face.

The through-hole of the cutting insert according to the present disclosure may comprise a tapered portion with the diameter increasing towards the upper face.

The through-hole of the cutting insert according to the present disclosure may comprise a first tapered portion with the diameter increasing towards the upper face and a second tapered portion with the diameter increasing towards the lower face.

The flat supporting surface of the cutting insert according to the present disclosure may extend inwards continuously to the through-hole. Alternatively, the lower face may have an interior cavity formed around the through-hole and the flat supporting surface extends inwards continuously to the interior cavity.

The lower face may comprise a chip breaker formed along the whole perimeter of the peripheral region, lower cutting edges formed on the outer periphery of the lower face along the chip breaker, and a flat supporting surface formed on the region inward of the chip breaker.

The cutting insert according to the present disclosure may be used for the dual purpose of roughing and finishing. The cutting insert according to the present disclosure has a structure whereby cutting edges for finishing and a sufficient bottom to support the force during roughing are provided. Also, since the cutting insert according to the present disclosure is provided with cutting edges for finishing in addition to cutting edges for roughing, it has an additional service life over conventional cutting inserts for roughing.

DETAILED DESCRIPTION

Hereinafter, cutting inserts according to embodiments of the present disclosure are described. The figures attached to the present disclosure are merely for convenience of explanation, and the shapes and the relative scales may be exaggerated or abridged.

Figure 1:
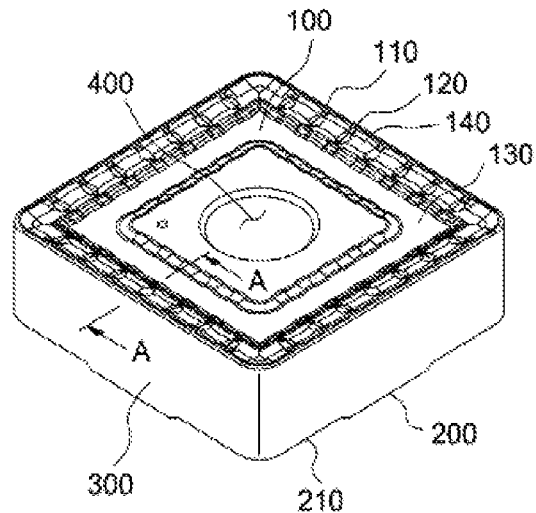
FIG. 1 is a perspective view depicting the upper face of a cutting insert in accordance with the present disclosure.
Figure 2:
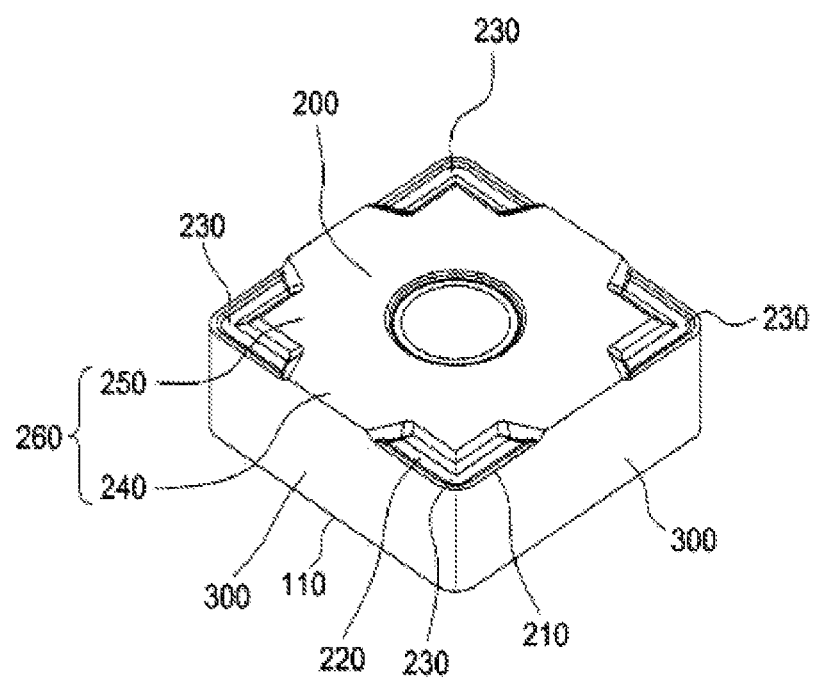
FIG. 2 is a perspective view of the lower face of the cutting insert of FIG. 1.
Figure 3:
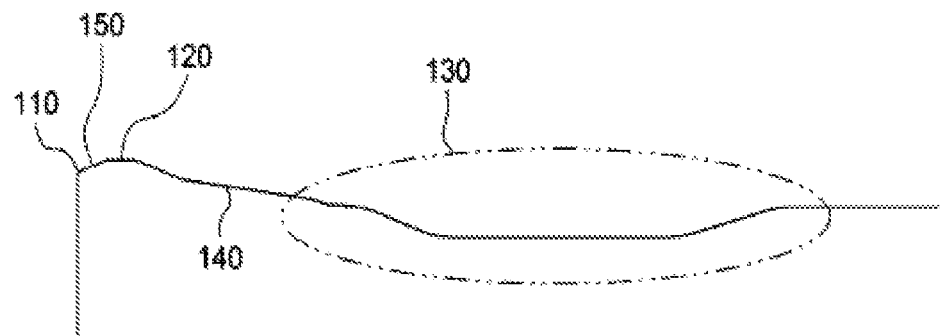
FIG. 3 is an altitude profile of the upper face along the line A-A of FIG. 1.

FIG. 1 is a perspective view depicting the upper face of a cutting insert in accordance with the present disclosure and FIG. 2 is a perspective view of the lower face of the cutting insert of FIG. 1. As a matter of course, although the terms "upper face" and "bottom face" can be exchanged depending on the orientation of the cutting insert, hereinafter the upper face 100 and the lower face 200 are defined based on FIG. 1 for convenience of explanation. FIG. 3 is an altitude profile of the upper face along the line A-A of FIG. 1.

As shown in FIG. 1, the cutting insert in accordance with the present disclosure comprises an upper face 100 and a lower face 200 opposite to each other, a plurality of side faces 300 connecting the upper face and the lower face, and a through-hole 400 passing through the upper face and the lower face. The upper face and lower face are non-identical cutting faces having dissimilar structures. Generally speaking, the upper face is provided with roughing structures while the lower face is provided with finishing structures.

The upper face 100 comprises an upper cutting edge 110 formed on the outer periphery thereof, a flat land 120 at the highest level disposed adjacent to and along the upper cutting edge 110, and a groove region 130 at a level lower than that of the upper cutting edge and disposed between the flat land 120 and the through-hole 400. The groove region 130 of the upper face 100 is connected by a downwardly inclined surface 140 extending from the flat land 120.

Figure 4:
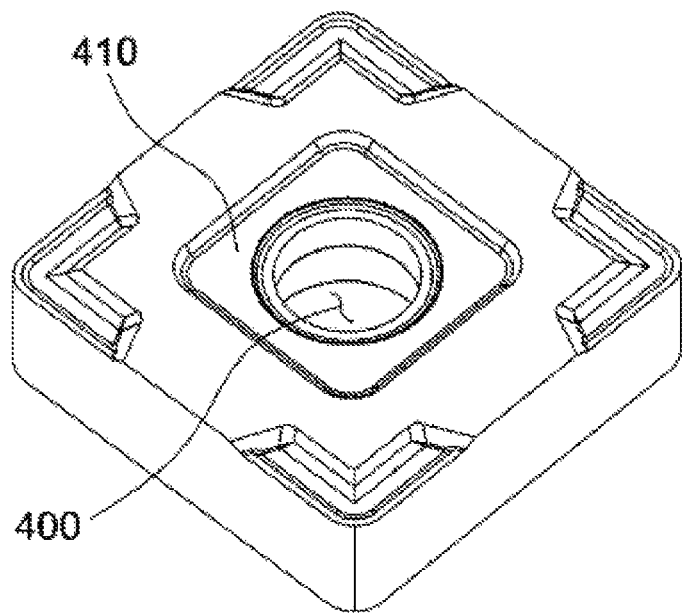
FIG. 4 is a perspective view of the lower face of another cutting insert in accordance with the present disclosure.

The lower face 200 comprises chip breakers 220 formed on parts of peripheral regions which include each of the corners 230 made by adjacent side faces 300, lower cutting edges 210 formed on the outer periphery of the lower face 200 along the chip breakers 220, and a flat supporting surface 260 formed on the peripheral regions 240 between adjacent chip breakers 220 and continuously to regions 260 inward of the chip breakers 220. The flat supporting surface 260 may extend inwards continuously to the through-hole 400, or the lower face may have an interior cavity 410 formed around the through-hole 400 as shown in FIG. 4 to allow closer contact.

As shown in FIG. 3, the upper face may comprise a negative land 150 inclined outward and disposed between the upper cutting edge 110 and the flat land 120. Of course, the upper face may lack a negative land. In this case, the upper cutting edges may have an R-shape formed by honing.

Figure 5:
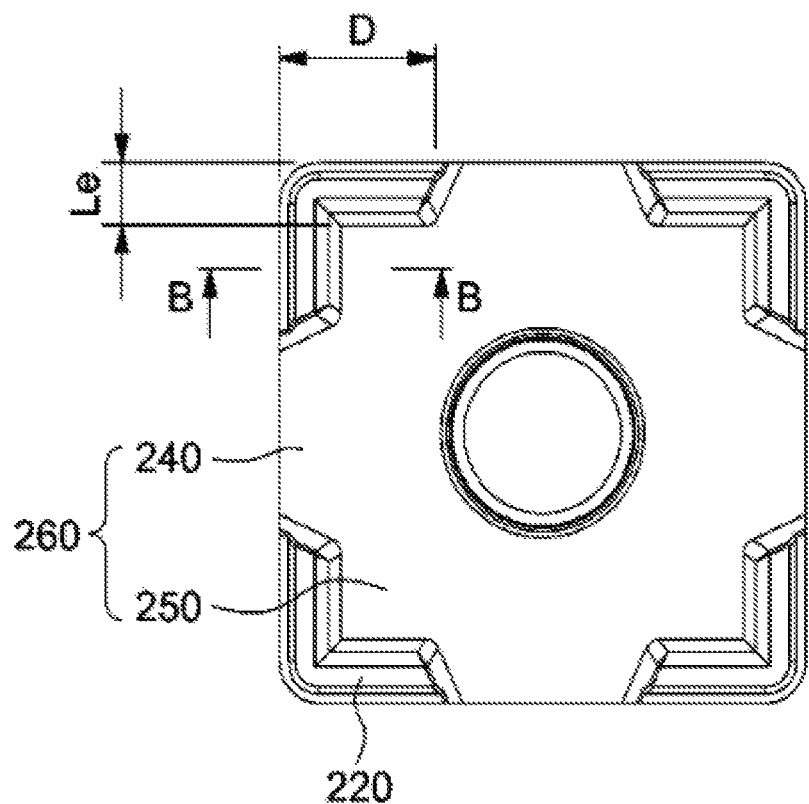
FIG. 5 is a planar view of the lower face of a cutting insert in accordance with the present disclosure.
Figure 6:
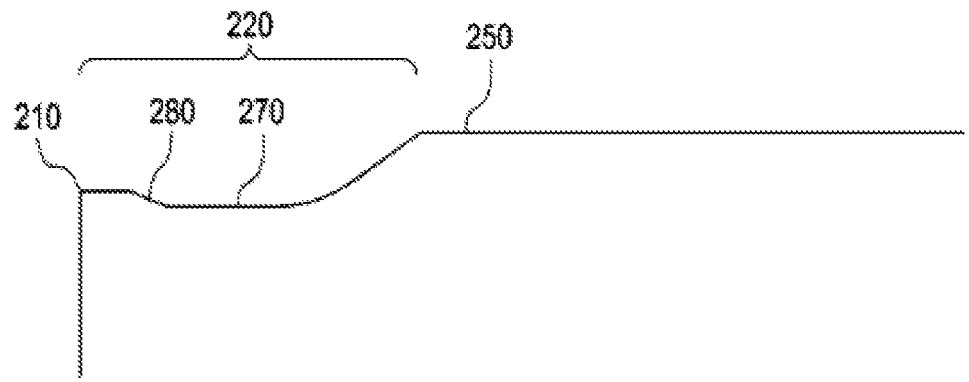
FIG. 6 is an altitude profile of the lower face along the line B-B of FIG. 5.

FIG. 5 is a planar view of the lower face of a cutting insert in accordance with the present disclosure. FIG. 6 is an altitude profile of the lower face along the line B-B of FIG. 5.

As shown in FIG. 6, the chip breakers 220 comprise groove regions 270 having a level lower than that of the lower cutting edges 210 and connected by a inclined surface 280 extending downwardly from the lower cutting edges 210, and the flat supporting surface 250 formed inward of the groove regions 270 is at the highest level of the lower face (i.e., is farthest from the upper face 100).

Figure 7:
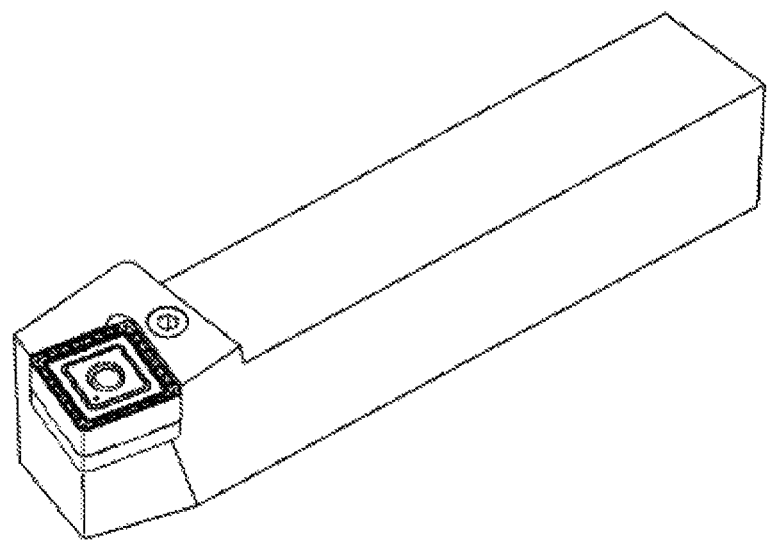
FIG. 7 is a perspective view depicting a cutting insert mounted on a tool holder for use in roughing.

FIG. 7 is a perspective view depicting a cutting insert mounted on a tool holder for use in roughing (i.e., the "upper face" 100 is operative). Here, the flat supporting surface 250 of the lower face 200 functions as a bottom supporting surface contacting the flat upper surface of the pocket sheet of a tool holder. Explaining the structure of the lower face 200 as seen in the orientation of FIG. 7 and with reference to the structures seen in FIG. 6, the chip breakers 220 comprise groove regions 270 having a level higher (i.e., closer to the upper face 100) than that of the lower cutting edges 210 and connected by an inclined surface 280 extending upwardly from the lower cutting edges 210, and the flat supporting surface 250 formed inward of the groove regions 270 is at the lowest bottom level (i.e., is farthest from the upper face 100).

When a cutting insert is used for finishing, it is mounted on a tool holder in a state as shown in FIG. 2, where the flat land 120 of the upper face 100 functions as a supporting surface contacting the flat upper surface of the pocket sheet of a tool holder. In this case, if a negative land 150 is formed on the upper face 100 or the edge is honed to an R-shape, they protect the upper cutting edge 110 from being worn by contact.

Whereas the lower face provides a chip control function when the cutting insert is mounted for finishing, it functions as the supporting surface when the cutting insert is mounted for roughing. For a finishing feed rate in the range of 0.2-1.0 mm/rev, the width (Le) of the chip breaker is set in a range of 0.8-3.5 mm. As the width (Le) of the chip breaker increases, the overhang increases during roughing, resulting in vibrations. Therefore, to prevent vibrations during roughing, it is desirable to set the width (Le) of the chip breaker to 1.0-3.0 mm for a feed rate of 0.4-0.8 mm/rev. Also, the depth of cut for finishing is within a straight wing length (D) as shown in FIG. 5, which is preferably in the range of 2-6 mm allowing a flat supporting surface 240 between adjacent chip breakers 220.

Figure 8:
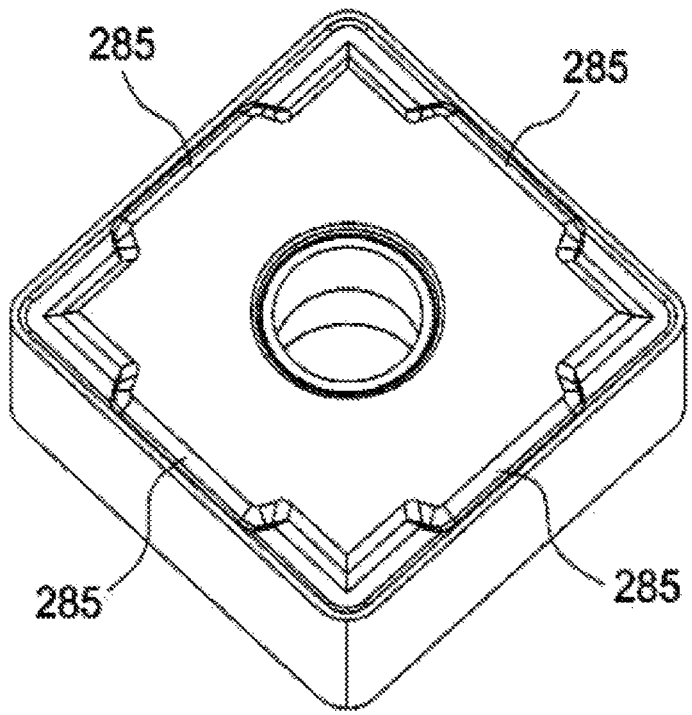
FIG. 8 is a perspective view of the lower face of another cutting insert in accordance with the present disclosure.

The peripheral regions 240 between adjacent chip breakers may be provided with spacing structures 285 to avoid interference of notch parts by forming chamfers or grooves of a small width on the outer periphery as shown in FIG. 8.

Figure 9:
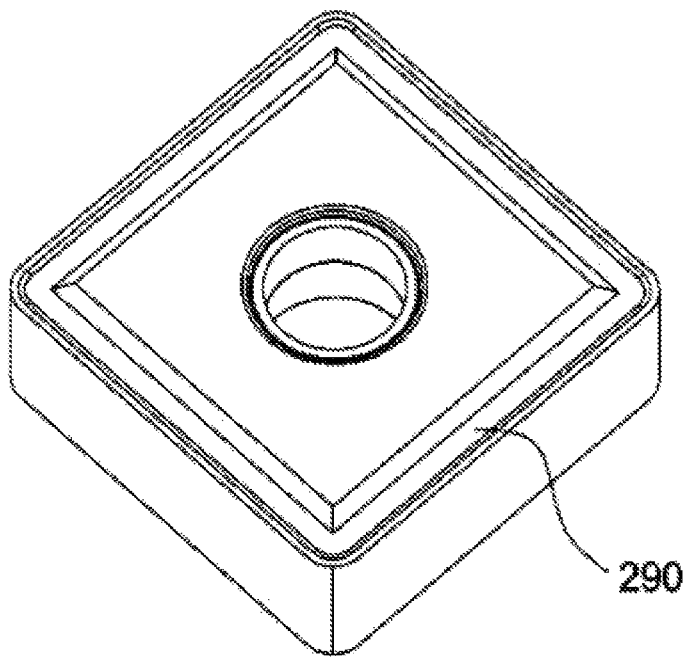
FIG. 9 is a perspective view of the lower face of still another cutting insert in accordance with the present disclosure.

When roughing a workpiece using the upper face for less severe cutting conditions, or finishing using the lower face for a relatively larger depth of cut, the chip breaker 290 may be formed along the whole perimeter of the peripheral region so that lower cutting edges are provided on the outer periphery along the whole perimeter of the lower face as shown in FIG. 9.

The chip breaker area is preferably no more than 50% of the whole area of the lower face excluding the through-hole so that the flat supporting surface 260 provides a sufficient supporting area for roughing.

If roughing is performed prior to finishing, a harsh cutting condition may damage the flat land 120 which is to be used as the supporting area for finishing. Therefore it is preferred that the cutting insert according to the present disclosure is used for finishing first, and then for roughing. In other words, the first cutting insert is used only for roughing and then discarded, and the subsequent cutting inserts are used for finishing first and then roughing, consecutively.

Figure 10:
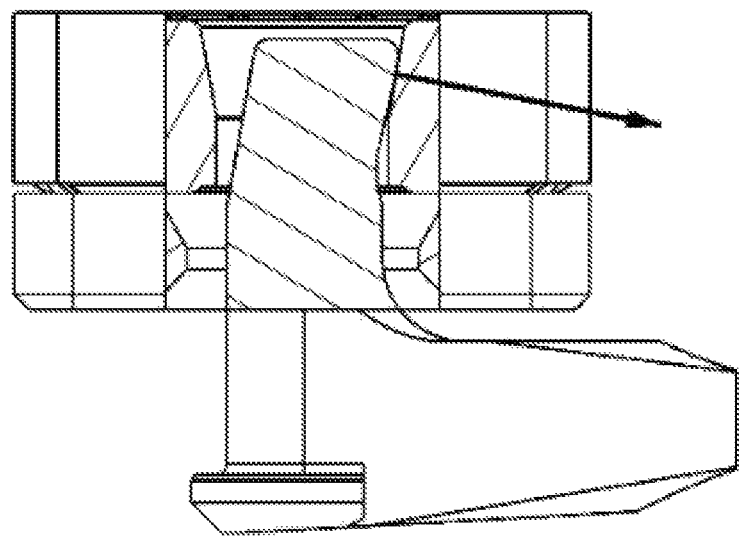
FIG. 10 is a side view showing the clamping force by a lever for a cutting insert mounted on a tool holder for roughing.
Figure 11:
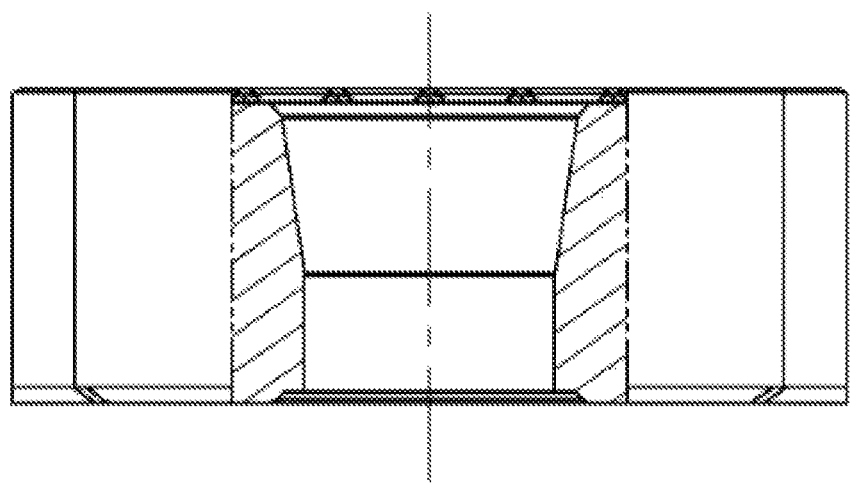
FIG. 11 is a sectional view showing a through-hole of a cutting insert in accordance with the present disclosure.
Figure 12:
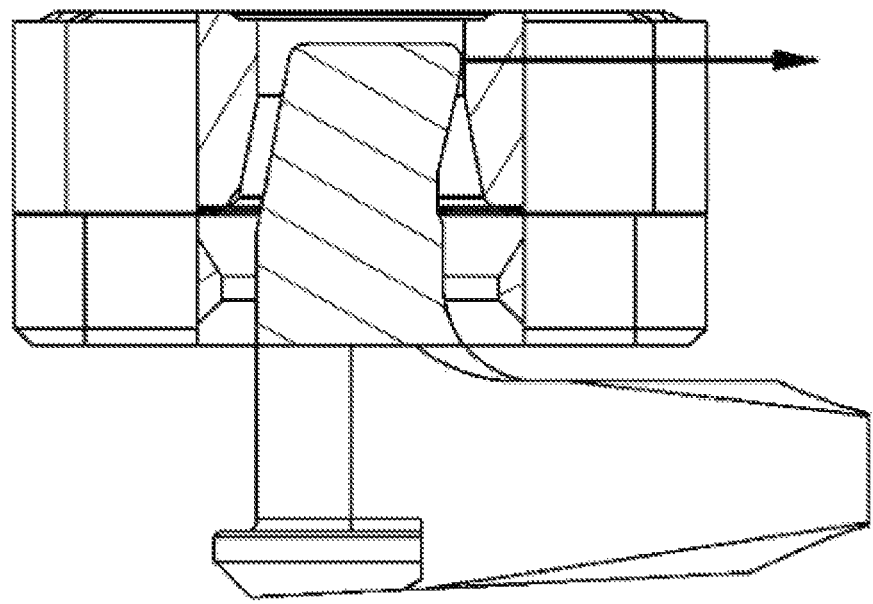
FIG. 12 is a side view showing the clamping force by a lever for a cutting insert mounted on a tool holder for finishing.
Figure 13:
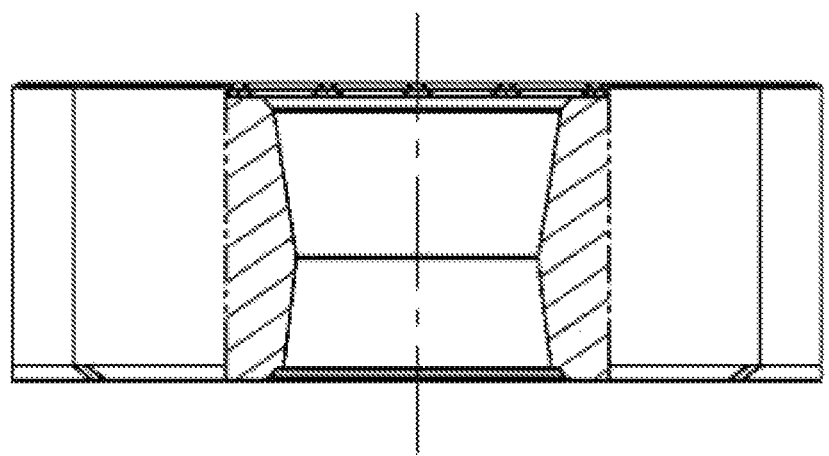
FIG. 13 is a sectional view showing a through-hole of another cutting insert in accordance with the present disclosure.
Figure 14:
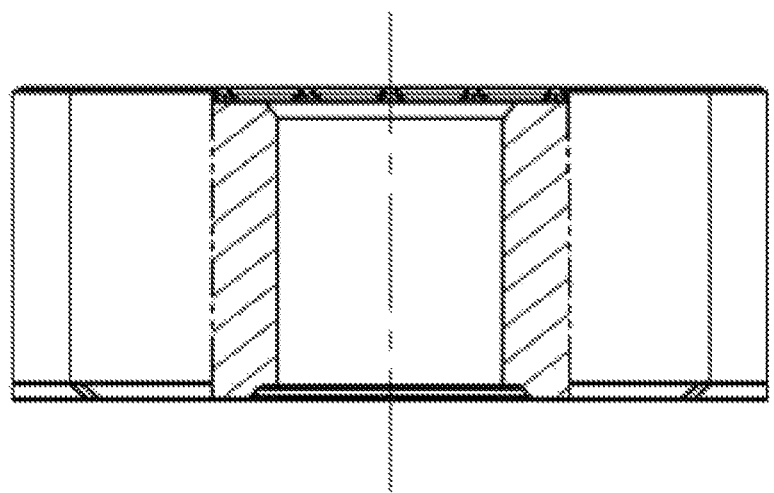
FIG. 14 is a sectional view showing a through-hole of still another cutting insert in accordance with the present disclosure.

FIG. 10 is a side view showing the clamping force imparted by a lever on a cutting insert mounted on a tool holder for roughing. If the through-hole of a cutting insert has a tapered portion with the diameter increasing towards the top as shown in FIG. 11, the direction of the clamping force is downwardly inclined toward the inside corner of the pocket as shown by the arrow in FIG. 10, thereby fastening the cutting insert more firmly to the pocket. If the cutting edge of FIG. 11 is mounted to a tool holder for finishing, the clamping force from the lever is directed laterally as shown by the arrow in FIG. 12. In order for the clamping force to be inclined downwardly toward the inside corner of the pocket even for the case of mounting the cutting insert for finishing, the through-hole is preferably made to comprise two tapered portions with the diameter increasing towards the top and with the diameter increasing towards the bottom as shown in FIG. 13. Of course, it is still possible to fasten a cutting insert with a lever even with a straight through-hole as shown in FIG. 14.

The cutting inserts and the tool holder mounted with the cutting inserts disclosed above may have various other embodiments without departing from the basic concept of the present disclosure. Accordingly, all the disclosed embodiments must be understood as being exemplary only and must not be construed to be the limit of the present disclosure. Accordingly, the range of protection for the present disclosure must be determined not by an embodiment described hereinabove, but by the attached claims. An alternative that is equivalent to the attached claims is included in the range of protection of the attached claims.

What is claimed is:

1. A cutting insert comprising an upper face and a lower face opposite to each other, a plurality of side faces connecting the upper face and the lower face, and a through-hole passing through the upper face and the lower face; wherein:
   the upper face and lower face are non-identical cutting faces having dissimilar structures;
   the upper face comprises an upper cutting edge formed on the outer periphery thereof, a flat land at the highest level disposed adjacent to and along the upper cutting edge, and a groove region at a level lower than that of the upper cutting edge and disposed between the flat land and the through-hole; and
   the lower face comprises chip breakers formed on parts of peripheral regions which include each of the corners made by adjacent side faces, lower cutting edges formed on the outer periphery of the lower face along the chip breakers, and a flat supporting surface formed on the peripheral regions between adjacent chip breakers and continuously on regions inward of the chip breakers.

2. The cutting insert according to claim 1, wherein:
   the flat supporting surface of the lower face is configured to serve as a seating surface when the upper surface is operative during a roughing operation; and
   the flat land of the upper face is configured to serve as a seating surface when the lower surface is operative during a finishing operation.

3. The cutting insert according to claim 1, wherein the upper face comprises a negative land inclined outward and disposed between the upper cutting edge and the flat land.

4. The cutting insert according to claim 1, wherein the groove region of the upper face is connected by an inclined surface extending downwardly from the flat land in a direction of the lower face.

5. The cutting insert according to claim 1, wherein:
   the chip breakers comprise groove regions having a level lower than that of the lower cutting edges and connected by an inclined surface extending downwardly from the lower cutting edges in a direction of the upper face, and
   the flat supporting surface is at the highest level of the lower face.

6. The cutting insert according to claim 1, wherein the through-hole comprises a tapered portion having a first diameter that increases in a direction of the upper face.

7. The cutting insert according to claim 1, wherein the through-hole comprises a first tapered portion having a first diameter that increases in a direction of the upper face, and a second tapered portion having a second diameter that increases in a direction of the lower face.

8. The cutting insert according to claim 1, wherein the flat supporting surface extends inwards continuously to the through-hole.

9. The cutting insert according to claim 1, wherein the lower face has an interior cavity formed around the through-hole and the flat supporting surface extends inwards continuously to the interior cavity.

10. The cutting insert according to claim 1, wherein the width (Le) of the chip breaker is in the range 1.0 to 3.0 mm, and the total chip breaker area is no more than 50% of the whole area of the lower face excluding the through-hole.

11. The cutting insert according to claim 1, wherein the peripheral regions between adjacent chip breakers are provided with spacing structures.

12. A cutting insert comprising an upper face and a lower face opposite to each other, a plurality of side faces connecting the upper face and the lower face, and a through-hole passing through the upper face and the lower face; wherein:
   the upper face and lower face are non-identical cutting faces having dissimilar structures;
   the upper face comprises an upper cutting edge formed on the outer periphery thereof, a flat land at the highest level disposed adjacent to and along the upper cutting edge, and a groove region at a level lower than that of the upper cutting edge and disposed between the flat land and the through-hole; and
   the lower face comprises a chip breaker formed along the whole perimeter of the peripheral region, lower cutting edges formed on the outer periphery of the lower face along the chip breaker, and a flat supporting surface formed on the region inward of the chip breaker.

13. The cutting insert according to claim 12, wherein:
   the flat supporting surface of the lower face is configured to serve as a seating surface when the upper surface is operative during a roughing operation; and
   the flat land of the upper face is configured to serve as a seating surface when the lower surface is operative during a finishing operation.

14. The cutting insert according to claim 12, wherein the upper face comprises a negative land inclined outward and disposed between the upper cutting edge and the flat land.

15. The cutting insert according to claim 12, wherein the groove region of the upper face is connected by an inclined surface extending downwardly from the flat land in a direction of the lower face.

16. The cutting insert according to claim 12, wherein:
   the chip breakers comprise groove regions having a level lower than that of the lower cutting edges and connected by an inclined surface extending downwardly from the lower cutting edges in a direction of the upper face, and
   the flat supporting surface is at the highest level of the lower face.

17. The cutting insert according to claim 12, wherein the through-hole comprises a tapered portion having a first diameter that increases in a direction of the upper face.

18. The cutting insert according to claim 12, wherein the through-hole comprises a first tapered portion having a first diameter that increases in a direction of the upper face, and a second tapered portion having a second diameter that increases in a direction of the lower face.

19. The cutting insert according to claim 12, wherein the flat supporting surface extends inwards continuously to the through-hole.

20. The cutting insert according to claim 12, wherein the lower face has an interior cavity formed around the through-hole and the flat supporting surface extends inwards continuously to the interior cavity.

21. The cutting insert according to claim 12, wherein the width (Le) of the chip breaker is in the range 1.0 to 3.0 mm, and the total chip breaker area is no more than 50% of the whole area of the lower face excluding the through-hole.

* * * * *